US007393278B2

(12) United States Patent
Gerson et al.

(10) Patent No.: US 7,393,278 B2
(45) Date of Patent: Jul. 1, 2008

(54) SLOT MACHINE GAME THAT ALLOWS PLAYER TO PURCHASE REEL RE-SPINS

(75) Inventors: Ignacio Gerson, Lantana, FL (US); Barbara Esses, Lantana, FL (US); Diego Yanivello, Lantana, FL (US)

(73) Assignee: ID Interactive, LLC, Delray Beach, FL (US)

( * ) Notice: Subject to any disclaimer, the term of this patent is extended or adjusted under 35 U.S.C. 154(b) by 172 days.

(21) Appl. No.: 11/035,691

(22) Filed: Jan. 14, 2005

(65) Prior Publication Data

US 2006/0160595 A1 Jul. 20, 2006

(51) Int. Cl.
*G07F 17/34* (2006.01)
*A63F 13/00* (2006.01)

(52) U.S. Cl. ...................... 463/20; 463/25; 273/143 R; 273/138.2

(58) Field of Classification Search .................. 463/20, 463/25–28, 10–13, 16–21; 273/143 R, 138.2, 273/138.1, 274, 292
See application file for complete search history.

(56) References Cited

U.S. PATENT DOCUMENTS

| | | | | |
|---|---|---|---|---|
| 5,704,835 | A | 1/1998 | Dietz, II | |
| 6,129,632 | A * | 10/2000 | Luciano | 463/12 |
| 6,641,477 | B1 | 11/2003 | Dietz, II | |
| 2003/0224849 | A1 * | 12/2003 | Geiger | 463/20 |
| 2004/0023715 | A1 | 2/2004 | Luciano | |
| 2004/0198490 | A1 | 10/2004 | Bansemer | |
| 2005/0026664 | A1 | 2/2005 | Bansemer | |
| 2005/0085285 | A1 | 4/2005 | Muskin | |
| 2005/0137007 | A1 | 6/2005 | Schaufelberger | |
| 2005/0176494 | A1 | 8/2005 | Thomas | |
| 2005/0181866 | A1 | 8/2005 | Baerlocher | |

OTHER PUBLICATIONS

PCT/US06/01034—WO/2006/076462 (counterpart PCT application), International Search Report, Written Opinion of the International Searching Authority.

* cited by examiner

*Primary Examiner*—Benjamin H Layno
(74) *Attorney, Agent, or Firm*—Muskin & Cusick LLC

(57) ABSTRACT

A method, device, and computer readable storage medium for implementing a slot machine game which allows a player to purchase a respin of a reel selected by the player. A cost of the respin is computed and presented to the player. The player can decide to pay the cost and get the respin or decline.

21 Claims, 8 Drawing Sheets

Figure 3
SHERLOCK
AT THE MURDER MANSION
3 OR MORE ADJACENT GO TO BONUS
DETECTIVE
WILD
RESPIN
RESPIN
RESPIN
RESPIN
RESPIN
GAME OVER
CREDITS 399
LINES 1
LINE BET 1
TOTAL BET 1
WIN 0
25¢
SELECT LINE
MAX BET SPIN
SPIN REELS
300
302
304
306
308
310
312

Figure 4
400
SHERLOCK
AT THE MURDER MANSION
3 OR MORE ADJACENT GO TO BONUS
RESPIN THIS REEL?
5 CREDITS
NO
YES
RESPIN
RESPIN
RESPIN
RESPIN
RESPIN
CREDITS 390
LINES 1
LINE BET 1
TOTAL BET 1
WIN 2
CASH OUT
PAYS HELP
25¢
SELECT LINE
BET PER LINE
MAX BET SPIN
SPIN REELS
402
404

SLOT MACHINE GAME THAT ALLOWS PLAYER TO PURCHASE REEL RE-SPINS

BACKGROUND OF THE INVENTION

1. Field of the Invention

The present invention is directed to a method, device, and computer readable storage medium for implementing a slot machine game which allows a player to purchase a respin of a reel.

2. Description of the Related Art

U.S. Pat. No. 5,704,835 discloses a system which initially plays like a standard slot machine game, whereupon completion of the initial spin of the reels a player can select a particular individual symbol(s) in an individual box to respin.

A disadvantage to the above system is that the overall payouts of the slot machine must be reduced in order to accommodate the advantage of allowing a player a re-spin.

Therefore, what is needed is a system which allows a player to re-spin without reducing overall payouts while generating additional revenue for the casino.

SUMMARY OF THE INVENTION

It is an aspect of the present invention to provide players an opportunity with a more exciting variation of slot machines.

The above aspects can be obtained by a method that includes (a) spinning reels of a slot machine; (b) offering a player a respin option to respin a selected reel selected by the player; (c) if the player exercises the respin option, then performing: (d) computing and displaying a cost of the respin; and (e) receiving a confirmation by the player to execute the respin at the computed cost.

The above aspects can also be obtained by (a) automatically selecting an element set from a plurality of elements; (b) triggering a bonus round; (c) allowing a player to select a chosen set from displayed elements; (d) if the chosen set matches the element set, displaying that the player has won and awarding a respective completion prize; and (e) if the chosen set does not match the element set, then allowing the player to continue to play the slot game without changing the element set.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
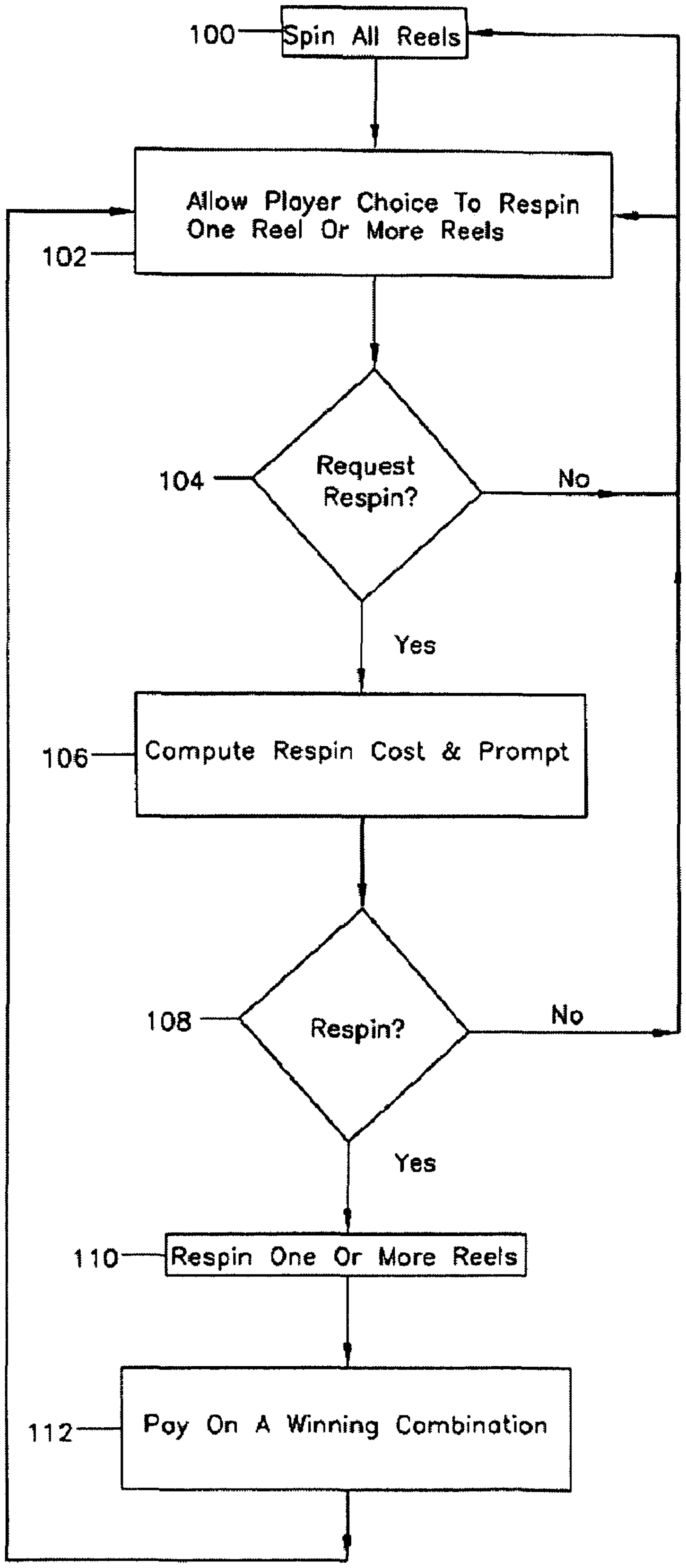
FIG. 1 is a flowchart illustrating an exemplary method of allowing for respins, according to an embodiment.

Reference will now be made in detail to the presently preferred embodiments of the invention, examples of which are illustrated in the accompanying drawings, wherein like reference numerals refer to like elements throughout.

The present general inventive concept relates to a slot machine game that allows a player to optionally respin reels that the player selects. If the player chooses to respin a reel, then a cost to respin that reel is determined and prompted to the player. The cost is determined based upon the actual game situation. If the player wishes to continue to respin after viewing the cost, then he or she can do so and the money is deducted from the player's credits, and the selected reel is respun. The player can continue to respin any of the reels or choose to start a new game.

FIG. 1 is a flowchart illustrating an exemplary method of allowing for respins, according to an embodiment.

The method can start with operation 100, which spins reels of the slot machine. Typically the player will pay an up-front cost to spin all the reels.

From operation 100, the method proceeds to operation 102, which gives the player a choice to respin a reel. This is offered after the reels have come to a stop from being spun in operation 100. The player can then inspect the reels too see if he or she wishes to respin one or more reels. For example, if the player is one symbol away from winning a jackpot, the player may find it desirable to try and respin for additional chances to win that jackpot.

From operation 102, the method proceeds to operation 104, which determines if the player has requested a respin. If the player does not wish to respin, the player can simply press a "spin" button as if there was no respin option and play again. The method can then return to operation 100 which begins a new game.

Alternatively, the player can request to respin. This can be done by pressing a reel, symbol, or button associated with a reel or symbol which indicates that the player wishes to respin a particular symbol or reel. Note that either an individual symbol can be respun (if the slot machine uses symbols that are on an individual reel), or an entire reel (such as a vertical column) can be respun.

If the determination in operation 104 determines that the player wishes to respin, then the method proceeds to operation 106 which computes the cost for the respin and prompts this cost to the player. More on computing the cost will be discussed below in more detail.

From operation 106, the method then proceeds to operation 108 which determines whether the player has decided to respin. If, after viewing the cost, the player then decides not to respin, the player can indicate his or her desire by pressing a "decline" button on the screen, by pressing a standard spin button, or by any other ways using the chosen interface to decline. If the cost for the respin is high, the player may decide that he or she would rather not respin, upon which he or she declines and the method can then return to operation 100, which begins a new game. From operation 108, the method can alternatively return to operation 102, which allows the player to select a different reel to respin. Perhaps a player may decline to respin one reel based on the cost but choose to respin another. A player can typically view the cost to respin all of the reels without actually respinning them.

If in operation 108 the player has decided to proceed with the respin after viewing the cost, the method proceeds to operation 110 which respins the reel. If the player does not have sufficient credits in order to purchase the respin, the player can insert additional credits to increase his or her balance. The individual reel that player has selected to respin will spin again, but the other reels will remain the same.

From operation 110, the method proceeds to operation 112, which pays on a winning combination on the respin, typically using the same standard paytable as used during the initial game (in operation 100). From operation 112, the method can return to operation 102, which allows the player an opportunity to respin again.

The cost for the respin depends on the particular reel selected to respin, the positions of the remaining reels (or symbols), the payout table, the current active paylines, and the house advantage for a respin.

Figure 2:
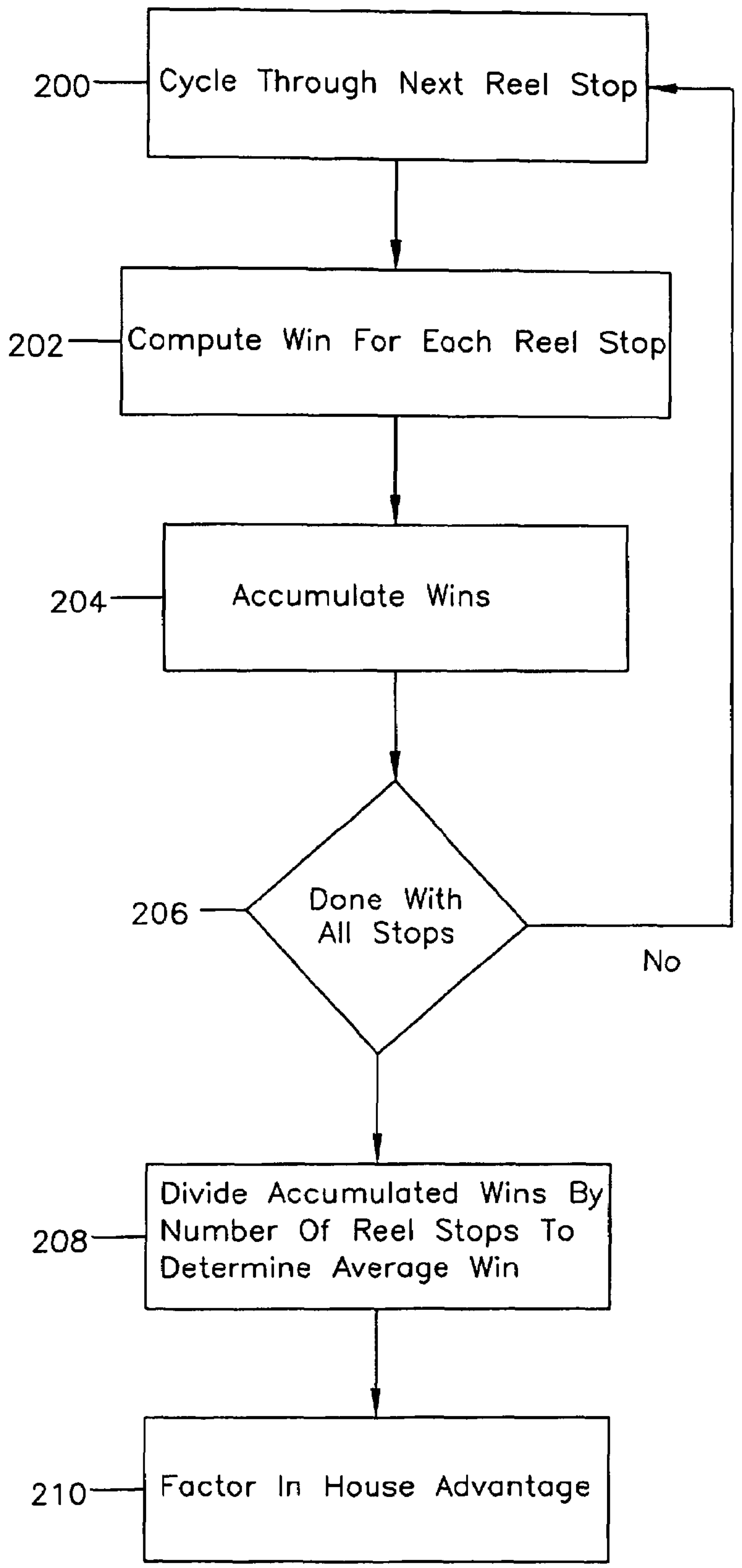
FIG. 2 is a flowchart illustrating an exemplary method to compute a cost for a respin, according to an embodiment.

FIG. 2 is a flowchart illustrating an exemplary method to compute a cost for a respin, according to an embodiment.

The method starts at operation 200, which cycles through a next reel stop. The present invention can use 256 (or any number) of reel stops. Each reel stop has a symbol on it.

From operation 200, the method proceeds to operation 202, which computes a win for the current reel stop. The win is computed by comparing the current paylines to a paytable to see which lines are winners and how much. In one embodiment, only wins that involve the respin are paid. For example, if a prize only involves reels 1, 2 and 3, then this prize won't be paid again for a respin of reel 5. Thus, a check can be done to see if the respun reel has a symbol which is used in determining a current prize on a payline. Alternatively, a respin can award all prizes which involve any of the reels, but of course this will be factored into the cost of the respin.

From operation 202, the method proceeds to operation 204, which accumulates wins on all of the current active paylines. Alternatively, all paylines can be active during a respin.

From operation 204, the method proceeds to operation 206, which checks if it is done with all the stops. If the method is not done, then the method returns to operation 200 which proceeds to the next symbol.

If the check in operation 206 determines that all stops have been accounted for, then the method proceeds to operation 208 which divides the accumulated wins by the number of symbol stops on the reel (the reel length). This results in an average win when that particular reel is respun.

From operation 208, the method proceeds to operation 210 which then factors in a house advantage into the cost computed in operation 208. The cost of the respin determined as described above would result in a break-even wager for the house (absent any rounding effects).

One way a house advantage can be incorporated into the computed cost is to multiply the cost by a house commission. For example, if the house wishes to earn 10% on all respins, then if the cost for a particular respin is determined above to be $100, then the method can multiply $100 (the computed cost) by 1.10 (the commission) which equals $110. Thus, a respin in this example would cost the player $110. Alternatively, this can also be computed by taking the cost of the respin and dividing it by a constant (such as 0.9). The value obtained for the cost of the respin after factoring in the house advantage can be rounded to the upper nearest integer value. The rounding may be forced higher, e.g. 1.4 will be rounded to 2.

The player will of course have no way to know how much of the cost goes towards the house advantage. The house advantage on a respin can be set higher than the house advantage than the basic game itself, it can be equal, or it can be set lower. If a win is not possible (e.g. an average computed win of $0), then a respin can cost $1 or else may not be permitted since some jurisdictions may prohibit a machine from taking a guaranteed losing wager.

Figure 3:
FIG. 3 is a screen shot illustrating a five reel game with a respin button for each reel, according to an embodiment.

FIG. 3 is a screen shot illustrating a five reel game with a respin button for each reel, according to an embodiment.

A five reel display 300 is shown, although the present general inventive concept can be applied to a game with any number of reels. Respin buttons 302, 304, 306, 308, 310 are each associated with a reel and can be used by the player to select to respin a respective reel. A spin button 312 is used to spin the reels. The spin button 312 can be used to initially spin the reels or to start a new game by spinning all of the reels without choosing to respin.

If a player wishes to respin a reel, then he can select the respective respin button. In this example, the player has achieved wild symbols in reel 1, reel 3, reel 4, and reel 5. If the player can achieve a wild symbol in the middle symbol of reel 2, this would give the player 5 wilds on a particular payline. Thus, the player may wish to respin reel 2.

Figure 4:
FIG. 4 is a screen shot illustrating a prompt screen prompting whether to respin, according to an embodiment.

FIG. 4 is a screen shot illustrating a prompt screen prompting whether to respin, according to an embodiment.

A respin prompt window 400 displays to the player how much a selected respin will cost. A decline button 402 allows the player to decline a respin, while an accept button 404 allows the player to confirm the respin at the displayed cost. This corresponds to operation 106 of FIG. 1.

In a further embodiment of the present general inventive concept, a bonus game can be implemented. A bonus game is a game which is triggered by achieving a predetermined combination of symbols from the main game. For example, getting three fingerprint symbols can trigger the bonus game, although of course any other known bonus trigger can be used.

A bonus round can be implemented wherein predetermined selections are made by the machine, and the player tries to guess the selections. Hints may be provided to the player. Each time the player enters the bonus round, the player has an additional chance to guess at the predetermined selections. The predetermined selections should not change until the player successfully selects them (or possibly when a new player plays the game), upon which a prize is awarded. This will be more easily illustrated by the following figures and examples.

Figure 5:
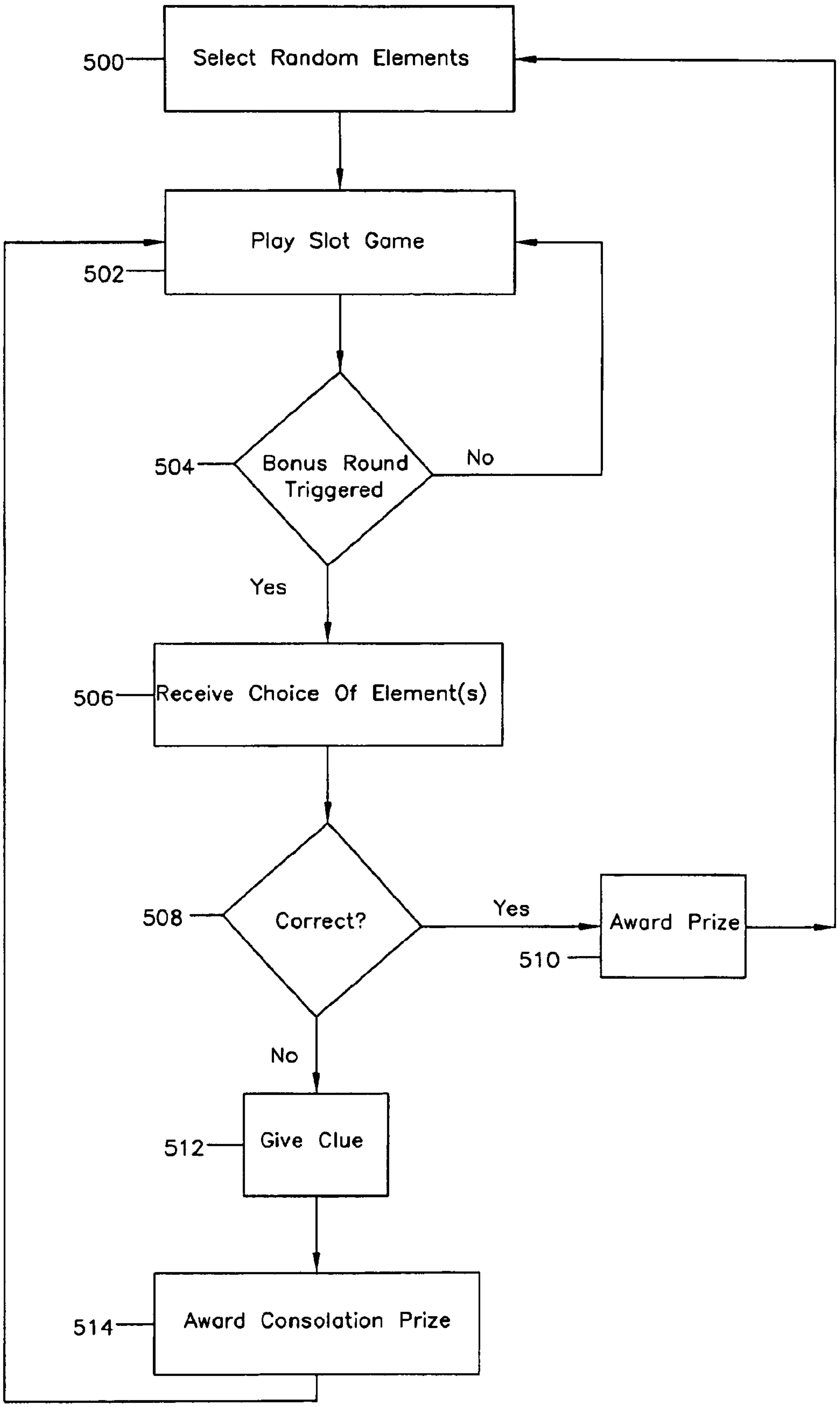
FIG. 5 is a flowchart illustrating an exemplary method to implement a bonus game, according to an embodiment.

FIG. 5 is a flowchart illustrating an exemplary method to implement a bonus game, according to an embodiment.

The method starts with operation 500, which automatically selects random elements. The random elements can be, for example, a murder weapon and a murder suspect. Of course any other type of theme can be used as well. Also, the present general inventive concept is not limited to two elements, but one, three, or any other number can be selected.

From operation 500, the method proceeds to operation 502 which plays the slot game. A player pays for and spins the reels as typically done.

From operation 502, the method proceeds to operation 504, which determines if a bonus round has been triggered. If a bonus round has not been triggered, then the method returns to operation 502 which continues to play the slot game. The respin embodiment described earlier can optionally be incorporated into the bonus game described herein.

If the bonus round has been triggered, then the method proceeds to operation 506 which receives a choice of elements from the player. Elements can be displayed to the player, and the player can pick one or more elements. The player is attempting to guess the selected elements selected in operation 500.

From operation 506, the method proceeds to operation 508, which determines if the player's choice in operation 506 is correct. If more than one element is selected in operation 500, then the player should guess all of these elements correctly in order to be considered correct.

If the player's choice of elements in operation 506 is not correct, then the method proceeds to operation 512 which gives the player a clue as to the correct selected elements. This operation can be optional.

From operation 512, the method proceeds to operation 514, which awards a consolation prize to the player. A consolation can be computed by the consolation prize can be determined by choosing a random value from a table of predetermined values. The average of this value can be lower than the prize that the player can obtain by guessing all of the elements correctly.

From operation 514, the method then returns to operation 502, which allows the player to continue to play the game. Since the player has received a hint, the player now may have a better chance of correctly guessing the selected elements when the player makes it to the bonus round again.

If the method in operation 508 determines that the player's choice in operation 506 was correct, then the method proceeds to operation 510 which awards a prize. An indication is presented to the player that the player has successfully made the proper choice(s). A large prize is typically awarded for the successful completion of the bonus round. The method can then proceed to operation 500, which can select random elements (anew) and start the method over again.

Figure 6:
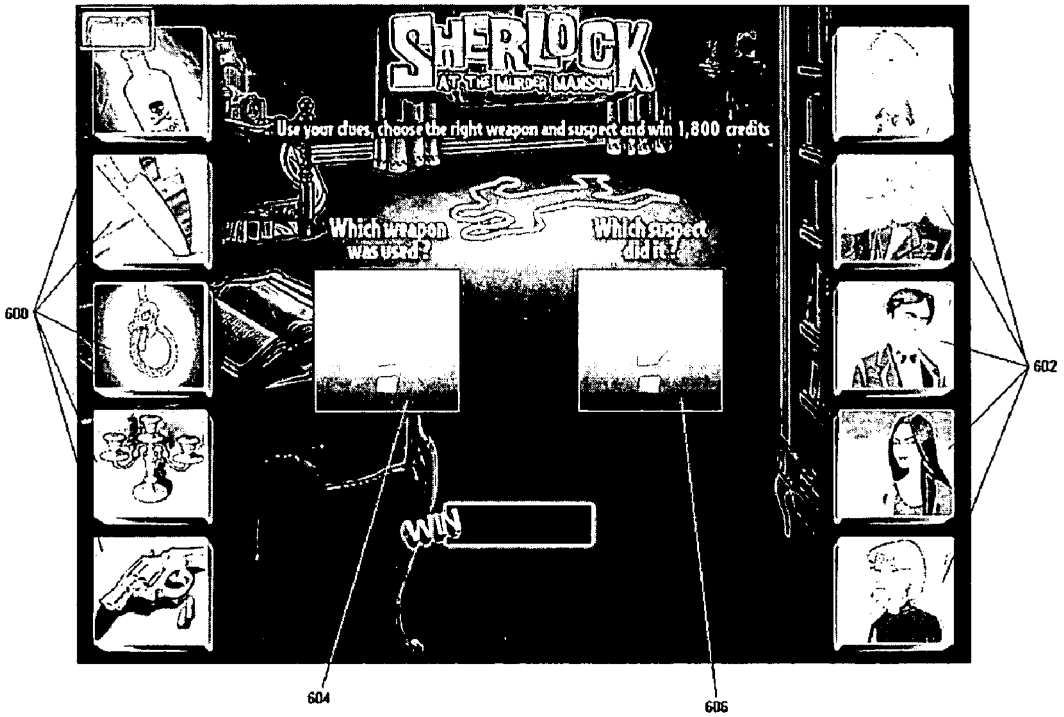
FIG. 6 is a screen shot illustrating an exemplary bonus game, according to an embodiment.

FIG. 6 is a screen shot illustrating an exemplary bonus game, according to an embodiment.

A first set of items 600 is displayed. In this example, the first set of items represents murder weapons, although any type of set or theme can be used. A second set of items 602 is displayed that represents suspects. Again, any type of set or theme can be used. Further, only one set can be used, two sets (as pictured) can be used, three or any number can also be used.

The player chooses one element from each displayed set (in this case the first set and the second set), in order to correctly guess the selected elements. This can be correlated to operation 506 from FIG. 5. The player's first choice box 604 and the player's second choice box 606 display the player's choices; each (or both) can be empty before the player has chosen the respective elements.

Figure 7:
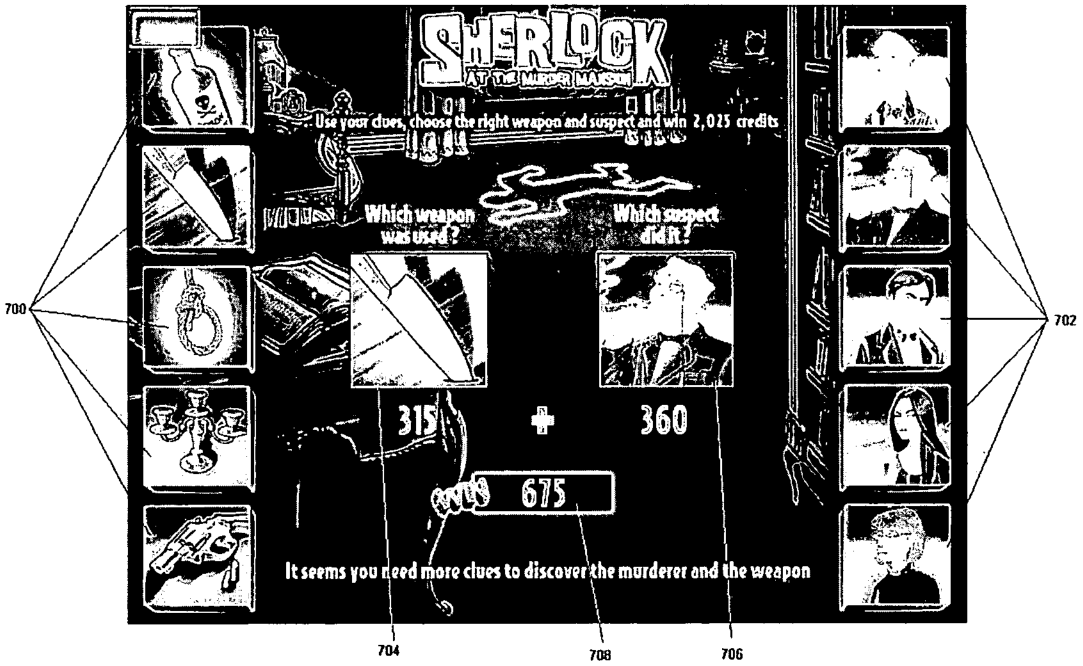
FIG. 7 is a screen shot illustrating an exemplary bonus game after items are chosen by the player, according to an embodiment.

FIG. 7 is a screen shot illustrating an exemplary bonus game after items are chosen by the player, according to an embodiment.

First set of items 700 and second set of items 702 are displayed. A first choice box 704 displays the player's choice for the first item, and the second choice box 706 displays the player's choice for the second item.

In this example, the player guessed wrong on both sets, and he receives a consolation prize amount 708. This corresponds to operation 514 in FIG. 5.

Figure 8:
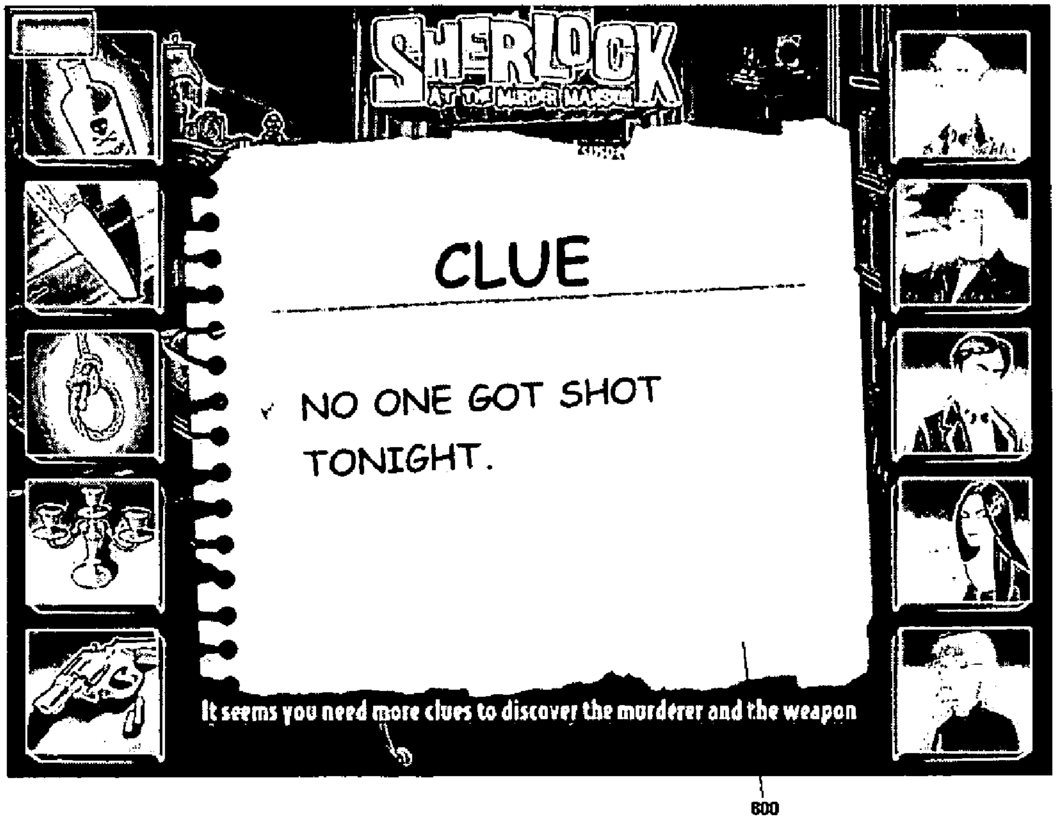
FIG. 8 is a screen shot illustrating an exemplary hint screen for a bonus game, according to an embodiment.

FIG. 8 is a screen shot illustrating an exemplary hint screen for a bonus game, according to an embodiment.

A clue display 800 is presented to the player which gives the player a clue as to which element(s) are selected. This corresponds to operation 512 in FIG. 5. The player will now have a better chance at choosing the proper elements the next time the player makes it to the bonus round.

Table I below illustrates an example set of five reels and a frequency of particular symbols therein. Table II below illustrates an actual mapping of the symbols for each reel. Table III below is a legend designating a particular symbol for each number used in Table II. Of course, the configuration exemplified in Tables I, II, and III are merely examples, and it can be appreciated that other configurations can be used as well.

TABLE I

| Symbol | Reel 1 | Reel 2 | Reel 3 | Reel 4 | Reel 5 | |
|---|---|---|---|---|---|---|
| Detective | 7 | 7 | 8 | 10 | 35 | |
| Pipe | 10 | 10 | 10 | 10 | 10 | |
| Hat | 10 | 10 | 10 | 10 | 10 | |
| Poison | 10 | 10 | 10 | 10 | 10 | |
| Revolver | 10 | 10 | 10 | 10 | 10 | |
| Knife | 10 | 10 | 10 | 10 | 10 | |
| Candelabra | 10 | 10 | 10 | 10 | 10 | |
| Lawyer | 10 | 10 | 10 | 10 | 10 | |
| Widow | 10 | 10 | 10 | 10 | 10 | |
| Son | 10 | 10 | 10 | 10 | 10 | |
| Wild | 9 | 9 | 8 | 9 | 9 | |
| Thumb | 10 | 10 | 10 | 10 | 10 | |
| Scatter | 3 | 4 | 4 | 4 | 2 | |
| Clock | 18 | 0 | 10 | 10 | 10 | |
| Rope | 0 | 24 | 10 | 10 | 10 | |
| Magnif | 18 | 0 | 10 | 10 | 10 | |
| Butler | 0 | 24 | 10 | 10 | 10 | |
| Secretary | 18 | 0 | 10 | 10 | 10 | |
| Foot | 0 | 23 | 10 | 10 | 10 | |
| Glass | 16 | 0 | 10 | 10 | 10 | |
| | 189 | 191 | 190 | 193 | 216 | 979 |

TABLE II

| Reel 1 | Reel 2 | Reel 3 | Reel 4 | Reel 5 |
|---|---|---|---|---|
| 11 | 12 | 1 | 16 | 19 |
| 5 | 15 | 5 | 14 | 1 |
| 2 | 17 | 18 | 9 | 18 |
| 10 | 4 | 20 | 11 | 8 |
| 11 | 5 | 7 | 6 | 17 |
| 5 | 15 | 17 | 14 | 16 |
| 7 | 17 | 19 | 15 | 11 |
| 18 | 11 | 2 | 4 | 7 |
| 20 | 12 | 7 | 18 | 9 |
| 16 | 15 | 16 | 8 | 2 |
| 7 | 17 | 19 | 10 | 11 |
| 18 | 10 | 1 | 17 | 7 |
| 20 | 5 | 12 | 3 | 16 |
| 4 | 4 | 10 | 9 | 3 |
| 7 | 15 | 5 | 15 | 11 |
| 16 | 10 | 19 | 20 | 7 |
| 14 | 8 | 3 | 6 | 1 |
| 9 | 19 | 16 | 8 | 18 |
| 20 | 1 | 6 | 2 | 19 |
| 16 | 17 | 15 | 3 | 14 |
| 7 | 13 | 14 | 19 | 1 |
| 9 | 7 | 19 | 20 | 20 |
| 5 | 15 | 18 | 2 | 2 |
| 3 | 10 | 1 | 8 | 12 |
| 16 | 5 | 6 | 3 | 1 |
| 10 | 17 | 4 | 10 | 10 |
| 6 | 15 | 12 | 20 | 2 |
| 20 | 10 | 15 | 7 | 9 |
| 16 | 5 | 18 | 3 | 1 |
| 10 | 1 | 4 | 1 | 10 |
| 7 | 11 | 10 | 19 | 7 |
| 20 | 15 | 7 | 17 | 8 |
| 4 | 19 | 2 | 3 | 1 |
| 2 | 1 | 3 | 7 | 14 |
| 3 | 7 | 18 | 5 | 20 |
| 7 | 2 | 11 | 12 | 17 |
| 4 | 19 | 2 | 19 | 1 |
| 18 | 10 | 19 | 8 | 9 |
| 14 | 9 | 18 | 20 | 8 |

TABLE II-continued

| Reel 1 | Reel 2 | Reel 3 | Reel 4 | Reel 5 |
|---|---|---|---|---|
| 3 | 15 | 8 | 3 | 4 |
| 4 | 17 | 17 | 14 | 1 |
| 18 | 12 | 19 | 8 | 20 |
| 16 | 6 | 11 | 12 | 14 |
| 6 | 7 | 2 | 10 | 10 |
| 5 | 8 | 20 | 14 | 1 |
| 18 | 5 | 12 | 13 | 18 |
| 14 | 6 | 16 | 12 | 14 |
| 12 | 17 | 10 | 10 | 16 |
| 16 | 19 | 8 | 16 | 4 |
| 20 | 2 | 7 | 18 | 12 |
| 14 | 6 | 14 | 9 | 20 |
| 11 | 9 | 1 | 4 | 18 |
| 16 | 19 | 4 | 7 | 19 |
| 20 | 4 | 17 | 2 | 2 |
| 14 | 6 | 18 | 15 | 12 |
| 6 | 7 | 11 | 6 | 8 |
| 8 | 19 | 14 | 17 | 5 |
| 18 | 4 | 15 | 2 | 17 |
| 14 | 10 | 17 | 7 | 1 |
| 10 | 12 | 2 | 18 | 7 |
| 6 | 19 | 8 | 17 | 6 |
| 3 | 17 | 10 | 6 | 8 |
| 14 | 9 | 19 | 20 | 10 |
| 9 | 12 | 9 | 10 | 11 |
| 5 | 19 | 4 | 5 | 5 |
| 2 | 17 | 18 | 17 | 9 |
| 14 | 11 | 16 | 16 | 10 |
| 16 | 12 | 9 | 8 | 3 |
| 12 | 19 | 4 | 10 | 12 |
| 9 | 17 | 14 | 2 | 9 |
| 6 | 15 | 18 | 15 | 1 |
| 16 | 8 | 9 | 4 | 17 |
| 20 | 5 | 20 | 10 | 8 |
| 8 | 19 | 8 | 19 | 5 |
| 2 | 1 | 14 | 15 | 1 |
| 14 | 9 | 5 | 1 | 17 |
| 16 | 7 | 3 | 11 | 7 |
| 9 | 19 | 20 | 6 | 10 |
| 20 | 17 | 4 | 15 | 1 |
| 14 | 8 | 7 | 16 | 12 |
| 8 | 11 | 12 | 8 | 14 |
| 12 | 15 | 5 | 1 | 19 |
| 18 | 6 | 15 | 6 | 1 |
| 14 | 8 | 17 | 16 | 15 |
| 8 | 17 | 7 | 9 | 17 |
| 7 | 11 | 2 | 17 | 16 |
| 9 | 3 | 8 | 6 | 11 |
| 16 | 19 | 17 | 19 | 1 |
| 8 | 17 | 12 | 5 | 17 |
| 1 | 2 | 7 | 7 | 9 |
| 10 | 3 | 13 | 14 | 3 |
| 4 | 4 | 5 | 12 | 1 |
| 11 | 11 | 10 | 18 | 14 |
| 12 | 19 | 12 | 7 | 15 |
| 16 | 15 | 13 | 5 | 16 |
| 3 | 3 | 2 | 9 | 8 |
| 6 | 11 | 16 | 3 | 12 |
| 12 | 7 | 8 | 7 | 1 |
| 7 | 12 | 11 | 20 | 14 |
| 4 | 1 | 20 | 10 | 10 |
| 6 | 9 | 18 | 13 | 7 |
| 12 | 7 | 8 | 14 | 1 |
| 18 | 2 | 15 | 1 | 4 |
| 8 | 3 | 2 | 11 | 9 |
| 1 | 10 | 20 | 5 | 16 |
| 14 | 4 | 8 | 9 | 13 |
| 18 | 9 | 16 | 15 | 10 |
| 4 | 19 | 2 | 2 | 1 |
| 13 | 10 | 20 | 5 | 2 |
| 2 | 13 | 13 | 7 | 15 |
| 9 | 8 | 15 | 20 | 7 |
| 4 | 17 | 12 | 4 | 1 |
| 13 | 5 | 9 | 12 | 4 |
| 2 | 6 | 6 | 8 | 19 |
| 18 | 2 | 8 | 11 | 3 |
| 10 | 19 | 12 | 10 | 1 |

TABLE II-continued

| Reel 1 | Reel 2 | Reel 3 | Reel 4 | Reel 5 |
|---|---|---|---|---|
| 20 | 9 | 5 | 12 | 18 |
| 16 | 8 | 19 | 19 | 6 |
| 1 | 3 | 16 | 6 | 3 |
| 2 | 15 | 3 | 2 | 1 |
| 5 | 17 | 17 | 12 | 4 |
| 8 | 11 | 19 | 16 | 18 |
| 11 | 3 | 16 | 9 | 3 |
| 3 | 2 | 15 | 2 | 5 |
| 14 | 10 | 9 | 11 | 12 |
| 18 | 19 | 19 | 16 | 13 |
| 11 | 15 | 14 | 6 | 15 |
| 5 | 17 | 20 | 18 | 8 |
| 7 | 11 | 11 | 12 | 4 |
| 12 | 12 | 3 | 11 | 1 |
| 11 | 13 | 10 | 8 | 17 |
| 5 | 17 | 12 | 18 | 5 |
| 3 | 8 | 15 | 15 | 3 |
| 14 | 9 | 17 | 11 | 1 |
| 20 | 3 | 9 | 5 | 20 |
| 5 | 19 | 3 | 18 | 8 |
| 18 | 15 | 15 | 1 | 19 |
| 6 | 17 | 10 | 20 | 18 |
| 4 | 3 | 16 | 2 | 2 |
| 5 | 4 | 3 | 5 | 6 |
| 18 | 15 | 1 | 4 | 4 |
| 20 | 8 | 6 | 12 | 18 |
| 2 | 17 | 5 | 19 | 1 |
| 9 | 2 | 3 | 9 | 15 |
| 14 | 15 | 10 | 4 | 6 |
| 20 | 12 | 11 | 2 | 18 |
| 16 | 3 | 8 | 18 | 1 |
| 1 | 19 | 9 | 16 | 16 |
| 8 | 9 | 4 | 17 | 9 |
| 20 | 2 | 6 | 13 | 2 |
| 14 | 4 | 18 | 1 | 1 |
| 12 | 17 | 1 | 14 | 16 |
| 8 | 6 | 16 | 18 | 15 |
| 3 | 2 | 6 | 13 | 12 |
| 10 | 9 | 17 | 9 | 1 |
| 1 | 7 | 10 | 16 | 5 |
| 16 | 19 | 14 | 4 | 14 |
| 18 | 2 | 12 | 10 | 15 |
| 10 | 17 | 17 | 9 | 11 |
| 11 | 15 | 6 | 17 | 5 |
| 16 | 12 | 5 | 6 | 1 |
| 18 | 7 | 14 | 11 | 15 |
| 2 | 5 | 1 | 3 | 10 |
| 20 | 15 | 7 | 9 | 5 |
| 4 | 19 | 9 | 1 | 17 |
| 18 | 6 | 20 | 7 | 1 |
| 14 | 5 | 11 | 4 | 15 |
| 20 | 15 | 7 | 5 | 6 |
| 12 | 19 | 9 | 15 | 17 |
| 18 | 4 | 20 | 7 | 1 |
| 13 | 13 | 11 | 17 | 20 |
| 16 | 15 | 14 | 19 | 5 |
| 9 | 10 | 6 | 10 | 8 |
| 2 | 4 | 4 | 15 | 6 |
| 6 | 19 | 10 | 16 | 3 |
| 11 | 15 | 2 | 4 | 9 |
| 7 | 17 | 6 | 14 | 10 |
| 18 | 5 | 15 | 5 | 15 |
| 3 | 3 | 3 | 8 | 11 |
| 9 | 15 | 13 | 4 | 4 |
| 12 | 6 | 9 | 14 | 1 |
| 1 | 8 | 4 | 12 | 20 |
| 8 | 7 | 5 | 3 | 14 |
| 10 | 15 | 8 | 19 | 3 |
| 14 | 6 | 9 | 14 | 2 |
| 1 | 19 | 4 | 18 | 20 |
| 3 | 17 | 5 | 3 | 14 |
| 10 | 15 | 7 | 20 | 1 |
| 6 | | 14 | 19 | 2 |
| | | 6 | 17 | 19 |
| | | 3 | 11 | 16 |
| | | | 20 | 1 |
| | | | | 11 |

TABLE II-continued

| Reel 1 | Reel 2 | Reel 3 | Reel 4 | Reel 5 |
|---|---|---|---|---|
| | | | | 12 |
| | | | | 9 |
| | | | | 4 |
| | | | | 11 |
| | | | | 19 |
| | | | | 16 |
| | | | | 20 |
| | | | | 3 |
| | | | | 19 |
| | | | | 7 |
| | | | | 10 |
| | | | | 6 |
| | | | | 8 |
| | | | | 7 |
| | | | | 20 |
| | | | | 6 |
| | | | | 19 |
| | | | | 5 |
| | | | | 12 |
| | | | | 6 |
| | | | | 18 |
| | | | | 2 |
| | | | | 1 |
| | | | | 6 |
| | | | | 4 |

TABLE III

| ID | Symbol |
|---|---|
| 1 | Detective |
| 2 | Pipe |
| 3 | Hat |
| 4 | Poison |
| 5 | Revolver |
| 6 | Knife |
| 7 | Candelabra |
| 8 | Lawyer |
| 9 | Widow |
| 10 | Son |
| 11 | Wild |
| 12 | Thumb |
| 13 | Scatter |
| 14 | Clock |
| 15 | Rope |
| 16 | Magnif |
| 17 | Butler |
| 18 | Secretary |
| 19 | Foot |
| 20 | Glass |

Table IV below is an exemplary paytable for a configuration of the game. In Table IV is listed each symbol, a quantity of that symbol, and a respective payout.

TABLE IV

| | X | Credits |
|---|---|---|
| Detective | 1 | — |
| | 2 | 10 |
| | 3 | 75 |
| | 4 | 1000 |
| | 5 | 10000 |
| Pipe | 1 | — |
| | 2 | 7 |
| | 3 | 50 |
| | 4 | 200 |
| | 5 | 2500 |
| Hat | 1 | — |
| | 2 | 7 |
| | 3 | 50 |

TABLE IV-continued

| | X | Credits |
|---|---|---|
| | 4 | 200 |
| | 5 | 2500 |
| Poison | 1 | — |
| | 2 | 5 |
| | 3 | 20 |
| | 4 | 100 |
| | 5 | 1500 |
| Revolver | 1 | — |
| | 2 | 5 |
| | 3 | 20 |
| | 4 | 100 |
| | 5 | 1500 |
| Scatter | 1 | — |
| | 2 | 2 |
| | 3 | 5 |
| | 4 | 20 |
| | 5 | 20 |
| Knife | 1 | — |
| | 2 | 3 |
| | 3 | 15 |
| | 4 | 60 |
| | 5 | 250 |
| Candelabra | 1 | — |
| | 2 | 3 |
| | 3 | 15 |
| | 4 | 60 |
| | 5 | 250 |
| Lawyer | 1 | — |
| | 2 | — |
| | 3 | 5 |
| | 4 | 25 |
| | 5 | 100 |
| Widow | 1 | — |
| | 2 | — |
| | 3 | 5 |
| | 4 | 25 |
| | 5 | 100 |
| Son | 1 | — |
| | 2 | — |
| | 3 | 5 |
| | 4 | 25 |
| | 5 | 100 |

Table V illustrates an example of payout percentages and volatility for a configuration of the game. Main payout is the percentage of coin in returned in the main game, bonus payout is the percentage of coin in returned in the bonus round, and progressive saving is the percentage of coin in used to contribute to a progressive jackpot. Hit ratio (1 payline) is the hit ratio for one payline, hit ratio (9 paylines) is the hit ratio for 9 paylines, and volatility is the volatility of the game (a measure of the riskiness). Of course, the figures in Table V are just one example and other configurations can be used.

TABLE V

| | |
|---|---|
| Main Payout | 73.36% |
| Bonus Payout | 21.09% |
| Progressive saving | 1.00% |
| Total Payout | 95.44% |
| Hit Ratio (1 payline) | 5.48% |
| Hit Ratio (9 paylines) | 39.78% |
| Volatility | 37.10 |

Table VI below illustrates exemplary payouts for the bonus game, according to an embodiment. After the player selects a suspect and a weapon, if both selections are correct, then two values from the high set are chosen using the associated probability weights. If either selection (the suspect or the weapon) is incorrect, then two values from the low set are chosen using the associated probability weights. The two chosen values are awarded as the bonus amounts and can be multiplied by the amount bet. The machine may optionally display the maximum (and/or the minimum) bonus amount the player can win in the bonus round.

TABLE VI

| LowSet | Prob | HighSet | Prob |
|---|---|---|---|
| 4 | 30.0% | 14 | 12.0% |
| 5 | 25.0% | 15 | 11.0% |
| 6 | 20.0% | 16 | 10.0% |
| 7 | 13.0% | 17 | 9.0% |
| 8 | 7.0% | 18 | 8.0% |
| 9 | 5.0% | 19 | 7.0% |
| | | 20 | 6.0% |
| | | 21 | 5.0% |
| | | 22 | 4.0% |
| | | 23 | 3.5% |
| | | 24 | 3.0% |
| | | 25 | 3.0% |
| | | 26 | 2.5% |
| | | 27 | 2.5% |
| | | 28 | 2.0% |
| | | 29 | 1.5% |
| | | 30 | 1.0% |
| | | 31 | 1.0% |
| | | 32 | 1.0% |
| | | 33 | 1.0% |
| | | 35 | 0.9% |
| | | 40 | 0.8% |
| | | 45 | 0.7% |
| | | 50 | 0.6% |
| | | 55 | 0.5% |
| | | 60 | 0.5% |
| | | 65 | 0.4% |
| | | 70 | 0.4% |
| | | 75 | 0.3% |
| | | 80 | 0.3% |
| | | 85 | 0.2% |
| | | 90 | 0.2% |
| | | 95 | 0.1% |
| | | 100 | 0.1% |

As stated previously, the examples in the tables above are merely examples, and the present methods described herein can be implemented using any slot machine game parameters, e.g. any number of reels, reel stops, paylines, etc.

It is also noted that any type of gaming machine can implement the present invention, whether the gaming machine is video or mechanical, finite or random environment, class III or any other class, local software or downloadable client, or any other software/hardware implementations of gaming machines currently known in the art.

It is also noted that any and/or all of the above embodiments, configurations, variations of the present invention described above can mixed and matched and used in any combination with one another. Any claim herein can be combined with any others (unless the results are nonsensical). Further, any mathematical formula given above also includes its mathematical equivalents, and also variations thereof such as multiplying any of the individual terms of a formula by a constant(s) or other variable. Moreover, any operation described herein can be performed in any sensible order.

Moreover, any description of a component or embodiment herein also includes hardware, software, and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of playing a slot game, the method comprising:

receiving an initial monetary amount;

spinning reels of a slot machine;

offering a player a respin option to respin a selected reel out of the reels, the selected reel selected by the player;

if the player exercises the respin option, then performing: computing and displaying a respin cost of the respin option; receiving a confirmation by the player to execute the respin option at the respin cost, and respinning the selected reel and awarding an award based on a resulting combination of the reels, wherein the computing comprises: cycling through all reel symbols on the selected reel and summing any respective payouts into a sum total payout; and dividing the sum total payout by a number of stops on the selected reel to determine the respin cost.

2. A method as recited in claim 1, wherein the computing further comprises: factoring a house advantage into the respin cost to determine the respin cost.

3. A method as recited in claim 1, wherein the reels of the slot machine comprise reel strips.

4. A method as recited in claim 1, wherein the reels of the slot machine comprise independently spinning symbols.

5. A method as recited in claim 1, further comprising: repeating the offering and performing as many times as the player wishes.

6. A method to play a wagering game on a gaming device, the method comprising:

completing a round of a slot game which comprises receiving an initial bet from a player and spinning reels to a first combination;

allowing the player to choose one of a following two options: 1) beginning a new game by repeating the completing, 2) respinning, which comprises:

allowing the player select a particular reel of the reels to respin at a particular respin cost;

receiving the particular respin cost from the player and respinning the particular reel; and awarding any earned respin award based on positions of the reels after the respin, wherein the particular respin cost is determined based on the particular reel selected by the player and positions of remaining reels not selected to respin in the first combination.

7. The method as recited in claim 6, wherein the particular respin cost is computed based on an average expected win for respinning the particular reel.

8. The method as recited in claim 6, wherein the particular respin cost is different than an alternate respin cost of respinning an alternate reel different than the particular reel.

9. The method as recited in claim 6, wherein the respin award does not include awards which do not involve a symbol on the particular reel.

10. The method as recited in claim 6, wherein the particular respin cost is computed by performing:

cycling though all reel stops on the particular reel and summing awards on paylines into an accumulated win;

dividing the accumulated win by a number of reel stops on the particular reel to determine an average win; and factoring in a house advantage into the average win to determine the particular respin cost.

11. The method as recited in claim 6, wherein the respin cost has a house advantage factored in.

12. The method as recited in claim 6, wherein the reels of the slot machine comprise reel strips.

13. The method as recited in claim 6, wherein the reels of the slot machine comprise independently spinning symbols.

14. A slot machine apparatus, comprising:

a computer, performing:

completing a round of a slot game which comprises receiving an initial bet from a player and spinning reels to a first combination;

allowing the player to choose one of a following two options: 1) beginning a new game by repeating the completing, 2) respinning, which comprises:

allowing the player select a particular reel of the reels to respin at a particular respin cost;

receiving the particular respin cost from the player and respinning the particular reel;

awarding any earned respin award based on positions of the reels after the respin, wherein the particular respin cost is determined based on the particular reel selected by the player and positions of remaining reels not selected to respin in the first combination; and an output device to output results of the computer.

15. The apparatus as recited in claim 14, wherein the particular respin cost is computed based on an average expected win for respinning the particular reel.

16. The apparatus as recited in claim 14, wherein the particular respin cost is different than an alternate respin cost of respinning an alternate reel different than the particular reel.

17. The apparatus as recited in claim 14, wherein the respin award does not include awards which do not involve a symbol on the particular reel.

18. The apparatus as recited in claim 14, wherein the particular respin cost is computed by performing:

cycling though all reel stops on the particular reel and summing awards on paylines into an accumulated win;

dividing the accumulated win by a number of reel stops on the particular reel to determine an average win; and factoring in a house advantage into the average win to determine the particular respin cost.

19. The apparatus as recited in claim 14, wherein the respin cost has a house advantage factored in.

20. The apparatus as recited in claim 14, wherein the reels of the slot machine comprise reel strips.

21. The apparatus as recited in claim 14, wherein the reels of the slot machine comprise independently spinning symbols.

* * * * *